United States Patent
Wang et al.

(10) Patent No.: US 10,417,135 B2
(45) Date of Patent: Sep. 17, 2019

(54) NEAR MEMORY MISS PREDICTION TO REDUCE MEMORY ACCESS LATENCY

(71) Applicant: Intel Corporation, Santa Clara, CA (US)

(72) Inventors: Zhe Wang, Hillsboro, OR (US); Zeshan A. Chishti, Hillsboro, OR (US); Alaa R. Alameldeen, Hillsboro, OR (US); Rajat Agarwal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 3 days.

(21) Appl. No.: 15/718,071

(22) Filed: Sep. 28, 2017

(65) Prior Publication Data

US 2019/0095332 A1  Mar. 28, 2019

(51) Int. Cl.
| | |
|---|---|
| *G06F 12/08* | (2016.01) |
| *G06F 12/12* | (2016.01) |
| *G06F 12/10* | (2016.01) |
| *G06F 12/0877* | (2016.01) |
| *G06F 12/0862* | (2016.01) |
| *G06F 12/128* | (2016.01) |
| *G06F 12/0888* | (2016.01) |
| *G06F 12/1009* | (2016.01) |
| *G06F 12/0817* | (2016.01) |

(52) U.S. Cl.
CPC ...... *G06F 12/0877* (2013.01); *G06F 12/0822* (2013.01); *G06F 12/0862* (2013.01); *G06F 12/0888* (2013.01); *G06F 12/1009* (2013.01); *G06F 12/128* (2013.01); *G06F 2212/602* (2013.01); *G06F 2212/621* (2013.01)

(58) Field of Classification Search
None
See application file for complete search history.

(56) References Cited

U.S. PATENT DOCUMENTS

| | | | | | |
|---|---|---|---|---|---|
| 4,858,111 | A | * | 8/1989 | Steps | G06F 12/0804 711/143 |
| 5,303,362 | A | * | 4/1994 | Butts, Jr. | G06F 12/0831 711/121 |
| 5,369,753 | A | * | 11/1994 | Tipley | G06F 12/0811 711/122 |
| 5,740,416 | A | * | 4/1998 | McMahan | G06F 9/3806 711/204 |

(Continued)

OTHER PUBLICATIONS

The Evicted-Address Filter: A Unified Mechanism to Address Both Cache Pollution and Thrashing by Seshadri ACM 2012 (Year: 2012).*

(Continued)

*Primary Examiner* — Reginald G Bragdon
*Assistant Examiner* — Paul M Knight
(74) *Attorney, Agent, or Firm* — Jordan IP Law, LLC

(57) ABSTRACT

Systems, apparatuses and methods may provide for technology to maintain a prediction table that tracks missed page addresses with respect to a first memory. If an access request does not correspond to any valid page addresses in the prediction table, the access request may be sent to the first memory. If the access request corresponds to a valid page address in the prediction table, the access request may be sent to the first memory and a second memory in parallel, wherein the first memory is associated with a shorter access time than the second memory.

22 Claims, 3 Drawing Sheets

(56) References Cited

U.S. PATENT DOCUMENTS

| | | | | |
|---|---|---|---|---|
| 5,774,685 | A * | 6/1998 | Dubey | G06F 9/383 711/122 |
| 5,778,436 | A * | 7/1998 | Kedem | G06F 12/0862 711/122 |
| 5,930,523 | A * | 7/1999 | Kawasaki | G06F 9/3001 712/32 |
| 6,059,835 | A * | 5/2000 | Bose | G06F 11/3461 702/186 |
| 6,081,871 | A * | 6/2000 | Hwangbo | G06F 12/0884 711/118 |
| 6,138,209 | A * | 10/2000 | Krolak | G06F 12/0864 711/122 |
| 6,496,903 | B1 * | 12/2002 | Terunuma | G06F 12/123 711/122 |
| 2002/0078061 | A1 * | 6/2002 | Wong | G06F 12/0862 |
| 2003/0208665 | A1 * | 11/2003 | Peir | G06F 9/383 711/169 |
| 2010/0191916 | A1 * | 7/2010 | Balakrishnan | G06F 12/0808 711/134 |
| 2016/0328320 | A1 * | 11/2016 | Dooley | G06F 12/0864 |

OTHER PUBLICATIONS

Gabriel H. Loh et al., "Supporting Very Large DRAM Caches with Compound-Access Scheduling and MissMap", IEEE Micro, May/Jun. 2012, IEEE Computer Society, pp. 70-78.

Mioinuddin K. Qureshi et al., "Fundamental Latency Trade-offs in Architecting DRAM Caches: Outperforming Impractical SRAM-Tags with a Simple and Practical Design", 2012 45th Annual IEEE/ACM International Symposium on Microarchitecture, Vancouver, BC, 2012, 12 pages.

Jaewoong Sim et al., "A Mostly-Clean DRAM Cache for Effective Hit Speculation and Self-Balancing Dispatch", In Proceedings of the 2012 45th Annual IEEE/ACM International Symposium on Micoarchitecture, IEEE Computer Society, pp. 1-11.

* cited by examiner

NEAR MEMORY MISS PREDICTION TO REDUCE MEMORY ACCESS LATENCY

TECHNICAL FIELD

Embodiments generally relate to memory structures.

BACKGROUND

Computing system memory architectures may be structured as various levels of host processor-side caches (e.g., level one/L1 cache, level 2/L2 cache, last level cache/LLC) and a system memory that includes a memory-side cache (e.g., "near memory") and additional memory (e.g., "far memory") that is slower to access than the memory-side cache.

When a search for data in the near memory is unsuccessful (e.g., a memory-side cache miss occurs), the requested data may be retrieved from the far memory. Frequent misses in the near memory may reduce performance and increase power consumption due to the retrieval of data from the relatively slow far memory. While hit-miss prediction techniques may exist for relatively small host processor-side caches, such techniques may not be scalable to larger memory-side caches in terms of accuracy or predictor size/overhead.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
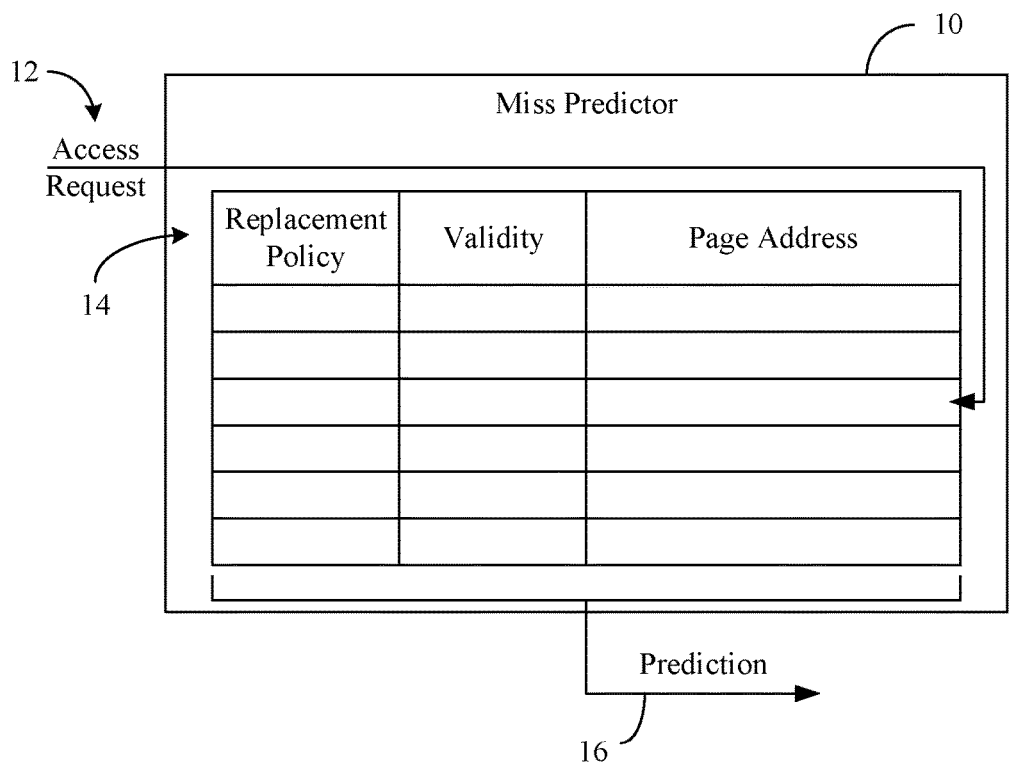
FIG. 1 is an illustration of an example of a miss predictor according to an embodiment.

Turning now to FIG. 1, a miss predictor 10 is shown in which an access request 12 is used to look up a page address in a prediction table 14. The prediction table 14 may generally track missed page addresses with respect to a near memory (e.g., memory-side cache having a 4-way set associative structure) of a two-level memory (2LM) architecture that also includes a far memory. In this regard, near memory misses (e.g., tag misses) may exhibit spatial locality so that if a memory request misses in the near memory, there may be a relatively high probability that other requests to the same page will also miss in the near memory. Thus, the results of the look up to the prediction table 14 may be used to generate a prediction 16 as to whether the access request 12 will result in a tag miss in the near memory. In addition to the full page addresses of near memory misses, each record of the prediction table 14 may also include one or more replacement policy (e.g., least recently used/LRU) bits and a validity bit (e.g., documenting whether the entry is valid).

Of particular note is that the illustrated prediction table 14 does not track tag hits in the near memory. The miss predictor 10 may prevent the prediction table 14 from tracking tag hits by, for example, bypassing any entry allocations and/or bit allocations in the prediction table 14 to tag hits. Accordingly, the size and/or overhead of the prediction table 14 may be significantly smaller than a conventional processor-side cache hit-miss predictor that tracks both hits and misses in the processor-side cache. The illustrated miss predictor 10 therefore enables greater scalability, which may be particularly useful in 2LM architectures having a relatively large (e.g., 32 GB or greater memory-side cache). As will be discussed in greater detail, the miss predictor 10 may also increase prediction accuracy.

Figure 2:
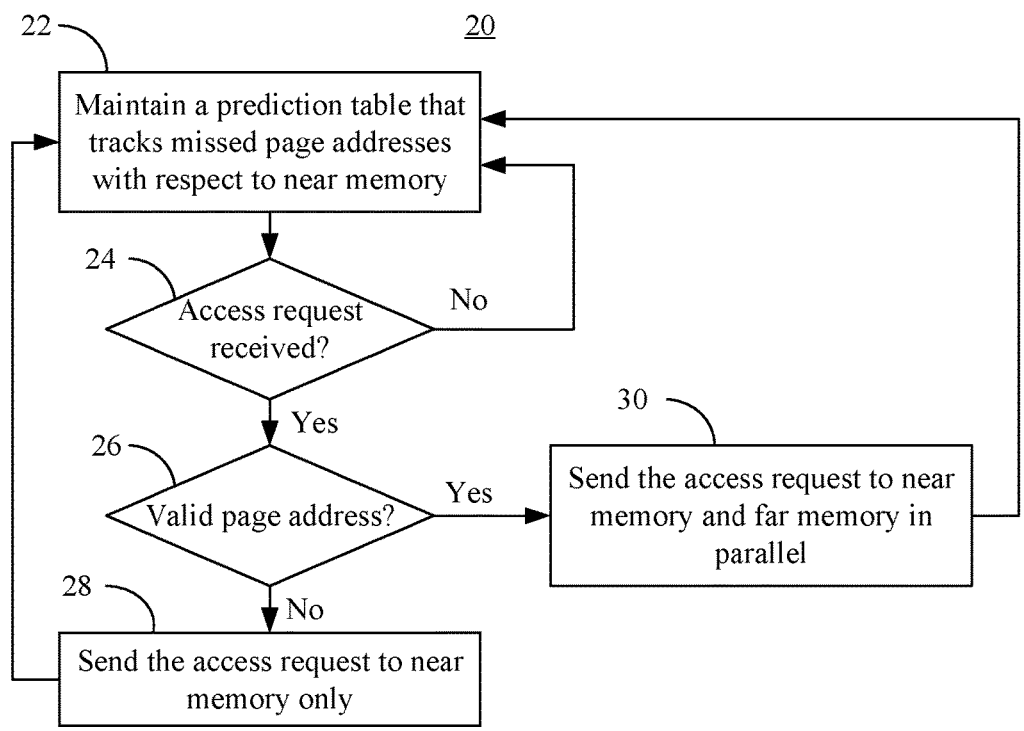
FIG. 2 is a flowchart of an example of a method of operating a semiconductor package apparatus according to an embodiment.

FIG. 2 shows a method 20 of operating a semiconductor package apparatus. The method 20 may generally be implemented in a miss predictor such as, for example, the miss predictor 10 (FIG. 1), already discussed. More particularly, the method 20 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 20 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 22 provides for maintaining a prediction table that tracks missed page addresses with respect to a first memory. Block 22 may include, for example, updating one or more replacement policy bits (e.g., to indicate recent use) of a prediction table entry associated with a valid page address if an access request corresponds to the valid page address in the prediction table. A determination may be made at block 24 as to whether a request to access the near memory has been received. If not, the illustrated method 20 continues to maintain the prediction table by returning to block 22. If an access request has been received, illustrated block 26 determines whether the access request corresponds to (e.g., matches) any valid page address in the prediction table. If the access request does not correspond to any valid page address in the prediction table, block 28 may send the access request to the near memory only and the illustrated method 20 returns to block 22.

If, however, it is determined at block 26 that the access request corresponds to a valid page address in the prediction table, a near memory tag miss is predicted and illustrated block 30 sends the access request to near memory and far memory in parallel. The near memory may generally be associated with a shorter access time than the far memory. Thus, the latency impact of a tag miss in the near memory may be eliminated if a tag miss does in fact occur in the near memory. Moreover, the illustrated block 26 improves accuracy by looking up full page addresses in the prediction table. By contrast, a conventional processor-side hit-miss predictor may use hash tables and/or partial tags, which may be subject to aliasing and, therefore, lower performance.

Figure 3:
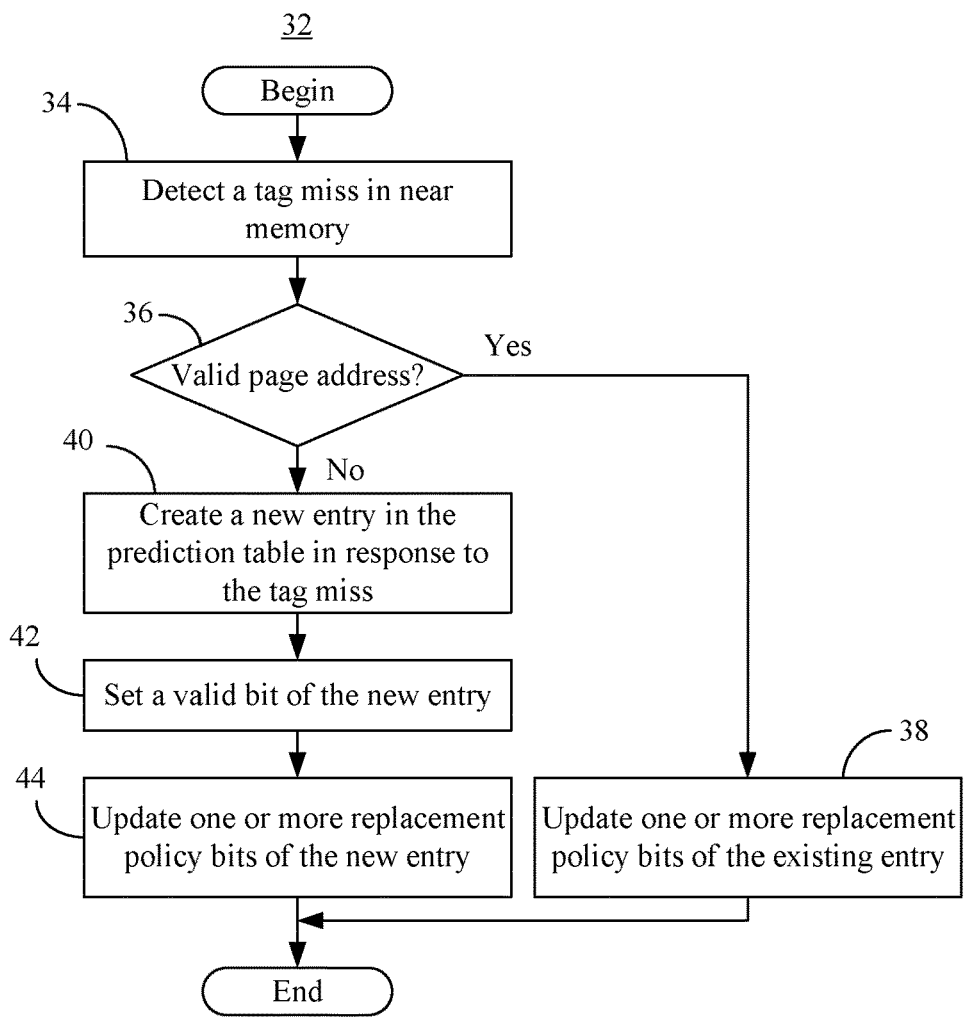
FIG. 3 is a flowchart of an example of a method of handling tag misses in near memory according to an embodiment.

FIG. 3 shows another method 32 of handling tag misses in near memory. The method 32 may generally be implemented in a miss predictor such as, for example, the miss predictor 10 (FIG. 1), already discussed. More particularly, the method 32 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS, TTL technology, or any combination thereof.

Illustrated processing block 34 provides for detecting a tag miss in near memory, wherein a determination may be made at block 36 as to whether the tag miss corresponds to any valid page address in a prediction table such as, for example, the prediction table 14 (FIG. 1), already discussed. If the tag miss corresponds to any valid page address in the prediction table, the miss was correctly predicted and block 38 may update one or replacement policy bits of the existing entry. The illustrated method 32 then terminates. If, however, block 36 determines that the tag miss does not correspond to any valid page address in the prediction table, the miss was not previously predicted. Accordingly, block 40 may create a new entry in the prediction table in response to the tag miss. Block 40 may include replacing an invalid entry in the prediction table or replacing a valid entry in the prediction table based on one or more replacement policy bits of the valid entry (e.g., by selecting the least recently used entry as the valid entry to be replaced). Additionally, illustrated block 42 may set a valid bit of the new entry, wherein one or more replacement bits of the new entry may be updated at block 44.

Figure 4:
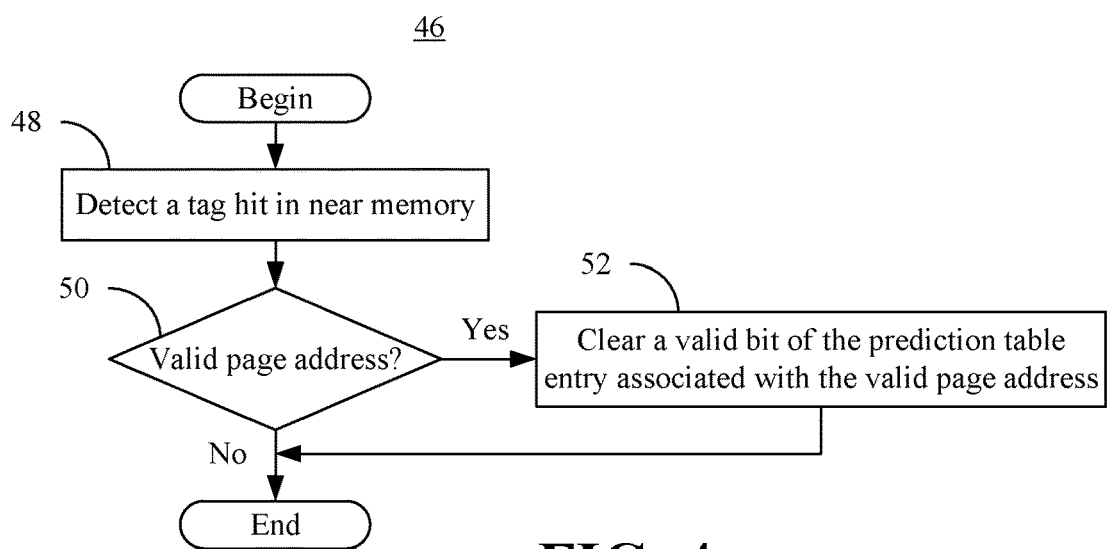
FIG. 4 is a flowchart of an example of a method of handling tag hits in near memory according to an embodiment.

FIG. 4 shows another method 46 of handling tag hits in near memory. The method 46 may generally be implemented in a miss predictor such as, for example, the miss predictor 10 (FIG. 1), already discussed. More particularly, the method 46 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS, TTL technology, or any combination thereof.

Illustrated processing block 48 provides for detecting a tag hit in the near memory, wherein a determination may be made at block 50 as to whether the tag hit resulted from an access request that corresponds to any valid page address in the prediction table. If so, a miss was incorrectly predicted in the near memory and block 52 may clear a valid bit of the prediction table entry associated with the valid page address in response to the tag hit. Otherwise, the illustrated method 46 terminates.

Figure 5:
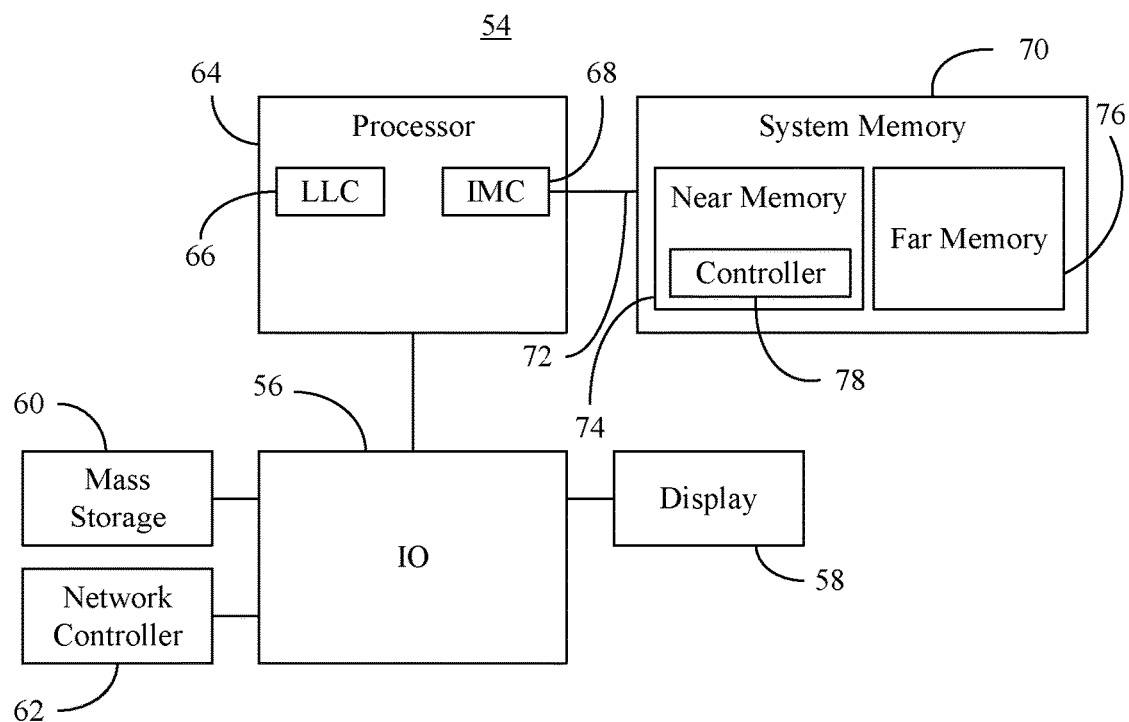
FIG. 5 is a block diagram of an example of a performance-enhanced computing system according to an embodiment.

Turning now to FIG. 5, a two-level memory-based computing system 54 is shown. The system 54 may generally be part of a server, desktop computer, notebook computer, tablet computer, convertible tablet, smart television (TV), personal digital assistant (PDA), mobile Internet device (MID), smart phone, wearable device, media player, etc., or any combination thereof. In the illustrated example, an input/output (IO) module 56 is communicatively coupled to a display 58 (e.g., liquid crystal display/LCD, light emitting diode/LED display, touch screen), mass storage 60 (e.g., hard disk drive/HDD, optical disk, solid state drive/SSD, flash memory) and a network controller 62 (e.g., wired, wireless). The illustrated system 54 may also include a host processor 64 (e.g., central processing unit/CPU) that includes a processor-side cache 66 (e.g., LLC) and an integrated memory controller 68 that communicates with a system memory 70 over a bus 72 or other suitable communication interface. The host processor 64 and the IO module 56 may be integrated onto a shared semiconductor die (not shown) in a system on chip (SoC) architecture.

The system memory 138 may include a first memory 74 (e.g., near memory, memory-side cache) and a second memory 76 (e.g., far memory that may be either volatile memory or non-volatile memory), wherein the first memory 74 may be accessed more quickly than the far memory 76. The first memory 74 may include a memory controller 78 that may generally implement one or more aspects of the method 20 (FIG. 2), the method 32 (FIG. 3), and/or the method 46 (FIG. 4), already discussed. The memory controller 78 may also include a miss predictor such as, for example, the miss predictor 10 (FIG. 1), already discussed. Thus, the memory controller 78 may generally maintain a prediction table that tracks missed page addresses with respect to the first memory 74. When the processor 64 issues an access request to the first memory 74, the memory controller 78 may send, if the access request does not correspond to any valid page address in the prediction table, the access request to the first memory 74. If the access request corresponds to a valid page address in the prediction table, the memory controller 78 may send the access request to the first memory 74 and the second memory 76 in parallel.

As already noted, the first memory 74 may be referred to as "near memory" in a two level memory/2LM architecture. In one example, the first memory 74 is a set associative (e.g., 4-way) structure, although other structures may be used. Moreover, the first memory 74 and/or the second memory 76 may include either volatile memory or non-volatile memory. Non-volatile memory is a storage medium that does not require power to maintain the state of data stored by the medium. In one embodiment, the system memory 70 is a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the storage devices that implement such standards may be referred to as DDR-based interfaces.

Figure 6:
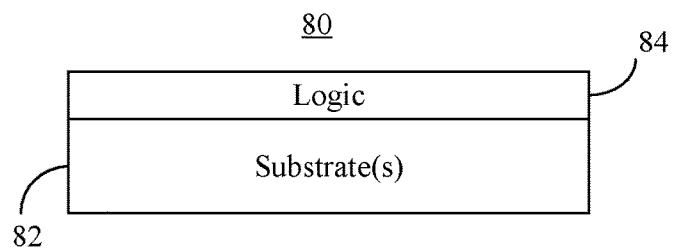
FIG. 6 is an illustration of an example of a semiconductor package apparatus according to an embodiment.

FIG. 6 shows a semiconductor package apparatus 80 (e.g., chip, die) that includes one or more substrates 82 (e.g., silicon, sapphire, gallium arsenide) and logic 84 (e.g., transistor array and other integrated circuit/IC components) coupled to the substrate(s) 82. The logic 84, which may be implemented at least partly in configurable logic and/or fixed-functionality logic hardware, may generally implement one or more aspects of the method 20 (FIG. 2), the method 32 (FIG. 3), and/or the method 46 (FIG. 4), already discussed. Thus, the logic 84 may maintain a prediction table that tracks missed page addresses with respect to a first memory, send, if an access request does not correspond to any valid page addresses in the prediction table, the access request to the first memory, and send, if the access request corresponds to a valid page address in the prediction table, the access request to the first memory and a second memory in parallel, wherein the first memory is associated with a shorter access time than the second memory.

Unexpectedly advantageous evaluation results include, for example, an average prediction accuracy of approximately 99.6%, a correction of approximately 75.1% near memory miss requests, and an increase in far memory bandwidth consumption of only about 3.68%.

ADDITIONAL NOTES AND EXAMPLES

Example 1 may include a semiconductor package apparatus comprising one or more substrates and logic coupled to the one or more substrates, wherein the logic is implemented at least partly in one or more of configurable logic or fixed functionality hardware logic, the logic coupled to the one or more substrates to maintain a prediction table that tracks missed page addresses with respect to a first memory, send, if an access request does not correspond to any valid page addresses in the prediction table, the access request to the first memory, send, if the access request corresponds to a valid page address in the prediction table, the access request to the first memory and a second memory in parallel, wherein the first memory is associated with a shorter access time than the second memory, update, if the access request corresponds to the valid page address in the prediction table, one or more replacement policy bits of a prediction table entry associated with the valid page address to maintain the prediction table, detect a tag hit in the first memory, wherein the tag hit is to be associated with the access request, clear, if the access request corresponds to the valid page address in the prediction table, a valid bit of the prediction table entry associated with the valid page address in response to the tag hit, and prevent the prediction table from tracking hits with respect to the first memory.

Example 2 may include the apparatus of Example 1, wherein, to maintain the prediction table, the logic coupled to the one or more substrates is further to detect a tag miss in the first memory, create, if the tag miss does not correspond to any valid page address in the prediction table, a new entry in the prediction table in response to the tag miss, set a valid bit of the new entry, and update one or more replacement policy bits of the new entry.

Example 3 may include the apparatus of Example 2, wherein the logic coupled to the one or more substrates is to replace an invalid entry in the prediction table to create the new entry.

Example 4 may include the apparatus of Example 2, wherein the logic coupled to the one or more substrates is to replace a valid entry in the prediction table based on one or more replacement policy bits of the valid entry to create the new entry.

Example 5 may include a two-level memory-based system comprising a processor to issue an access request, a first memory, a second memory, wherein the first memory is associated with a shorter access time than the second memory, and a memory controller coupled to the processor, the first memory and the second memory, the memory controller to maintain a prediction table that tracks missed page addresses with respect to the first memory, send, if the access request does not correspond to any valid page addresses in the prediction table, the access request to the first memory, and send, if the access request corresponds to a valid page address in the prediction table, the access request to the first memory and the second memory in parallel.

Example 6 may include the system of Example 5, wherein, to maintain the prediction table, the memory controller is to detect a tag miss in the first memory, create, if the tag miss does not correspond to any valid page address in the prediction table, a new entry in the prediction table in response to the tag miss, set a valid bit of the new entry, and update one or more replacement policy bits of the new entry.

Example 7 may include the system of Example 6, wherein the memory controller is to replace an invalid entry in the prediction table to create the new entry.

Example 8 may include the system of Example 6, wherein the memory controller is to replace a valid entry in the prediction table based on one or more replacement policy bits of the valid entry to create the new entry.

Example 9 may include the system of Example 5, wherein, if the access request corresponds to the valid page address in the prediction table, the memory controller is to update one or more replacement policy bits of a prediction table entry associated with the valid page address to maintain the prediction table.

Example 10 may include the system of Example 5, wherein the memory controller is to detect a tag hit in the first memory, wherein the tag hit is to be associated with the access request, and clear, if the access request corresponds to the valid page address in the prediction table, a valid bit of a prediction table entry associated with the valid page address in response to the tag hit.

Example 11 may include the system of any one of Examples 5 to 10, wherein the memory controller is to prevent the prediction table from tracking hits with respect to the first memory.

Example 12 may include a semiconductor package apparatus comprising one or more substrates, and logic coupled to the one or more substrates, wherein the logic is implemented at least partly in one or more of configurable logic or fixed functionality hardware logic, the logic coupled to the one or more substrates to maintain a prediction table that tracks missed page addresses with respect to a first memory, send, if an access request does not correspond to any valid page addresses in the prediction table, the access request to the first memory, and send, if the access request corresponds to a valid page address in the prediction table, the access request to the first memory and a second memory in parallel, wherein the first memory is associated with a shorter access time than the second memory.

Example 13 may include the apparatus of Example 12, wherein, to maintain the prediction table, the logic coupled to the one or more substrates is to detect a tag miss in the first memory, create, if the tag miss does not correspond to any valid page address in the prediction table, a new entry in the prediction table in response to the tag miss, set a valid bit of the new entry, and update one or more replacement policy bits of the new entry.

Example 14 may include the apparatus of Example 13, wherein the logic coupled to the one or more substrates is to replace an invalid entry in the prediction table to create the new entry.

Example 15 may include the apparatus of Example 13, wherein the logic coupled to the one or more substrates is to replace a valid entry in the prediction table based on one or more replacement policy bits of the valid entry to create the new entry.

Example 16 may include the apparatus of Example 12, wherein, if the access request corresponds to the valid page address in the prediction table, the logic coupled to the one or more substrates is to update one or more replacement policy bits of a prediction table entry associated with the valid page address to maintain the prediction table.

Example 17 may include the apparatus of Example 12, wherein the logic coupled to the one or more substrates is to detect a tag hit in the first memory, wherein the tag hit is to be associated with the access request, and clear, if the access request corresponds to the valid page address in the prediction table, a valid bit of a prediction table entry associated with the valid page address in response to the tag hit.

Example 18 may include the apparatus of any one of Examples 12 to 17, wherein the logic coupled to the one or more substrates is to prevent the prediction table from tracking hits with respect to the first memory.

Example 19 may include a method of operating a semiconductor package apparatus, comprising maintaining a prediction table that tracks missed page addresses with respect to a first memory, sending, if an access request does not correspond to any valid page addresses in the prediction table, the access request to the first memory, and sending, if the access request corresponds to a valid page address in the prediction table, the access request to the first memory and a second memory in parallel, wherein the first memory is associated with a shorter access time than the second memory.

Example 20 may include the method of Example 19, wherein maintaining the prediction table includes detecting a tag miss in the first memory, creating, if the tag miss does not correspond to any valid page address in the prediction table, a new entry in the prediction table in response to the tag miss, setting a valid bit of the new entry, and updating one or more replacement policy bits of the new entry.

Example 21 may include the method of Example 20, wherein creating the new entry includes replacing an invalid entry in the prediction table.

Example 22 may include the method of Example 20, wherein creating the new entry includes replacing a valid entry in the prediction table based on one or more replacement policy bits of the valid entry.

Example 23 may include the method of Example 19, wherein maintaining the prediction table includes, if the access request corresponds to the valid page address in the prediction table, updating one or more replacement policy bits of a prediction table entry associated with the valid page address.

Example 24 may include the method of Example 19, further including detecting a tag hit in the first memory, wherein the tag hit is associated with the access request, and clearing, if the access request corresponds to the valid page address in the prediction table, a valid bit of a prediction table entry associated with the valid page address in response to the tag hit.

Example 25 may include the method of any one of Examples 19 to 24, further including preventing the prediction table from tracking hits with respect to the first memory.

Example 26 may include a semiconductor package apparatus comprising means for maintaining a prediction table that tracks missed page addresses with respect to a first memory, means for sending, if an access request does not correspond to any valid page addresses in the prediction table, the access request to the first memory, and means for sending, if the access request corresponds to a valid page address in the prediction table, the access request to the first memory and a second memory in parallel, wherein the first memory is associated with a shorter access time than the second memory.

Example 27 may include the apparatus of Example 26, wherein the means for maintaining the prediction table includes means for detecting a tag miss in the first memory, means for creating, if the tag miss does not correspond to any valid page address in the prediction table, a new entry in the prediction table in response to the tag miss, means for setting a valid bit of the new entry, and means for updating one or more replacement policy bits of the new entry.

Example 28 may include the apparatus of Example 27, wherein the means for creating the new entry includes means for replacing an invalid entry in the prediction table.

Example 29 may include the apparatus of Example 27, wherein the means for creating the new entry includes means for replacing a valid entry in the prediction table based on one or more replacement policy bits of the valid entry.

Example 30 may include the apparatus of Example 26, wherein the means for maintaining the prediction table includes, if the access request corresponds to the valid page address in the prediction table, means for updating one or more replacement policy bits of a prediction table entry associated with the valid page address.

Example 31 may include the apparatus of Example 26, further including means for detecting a tag hit in the first memory, wherein the tag hit is to be associated with the access request, and means for clearing, if the access request corresponds to the valid page address in the prediction table, a valid bit of a prediction table entry associated with the valid page address in response to the tag hit.

Example 32 may include the apparatus of any one of Examples 26 to 31, further including means for preventing the prediction table from tracking hits with respect to the first memory.

Low overhead technology described herein may therefore significantly reduce memory access latencies and, in turn, improve performance. For example, by predicting near memory misses earlier, the technology enables far memory to be accessed more quickly and more reliably.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor package apparatus comprising:
    one or more substrates; and
    logic coupled to the one or more substrates, wherein the logic is implemented at least partly in one or more of configurable logic or fixed functionality logic hardware, the logic coupled to the one or more substrates configured to:
    maintain a prediction table that tracks missed page addresses with respect to a first memory,
    send, if an access request does not correspond to any valid page address in the prediction table, the access request to the first memory,
    send, if the access request corresponds to a valid page address in the prediction table, the access request to the first memory and a second memory in parallel, wherein the first memory is associated with a shorter access time than the second memory,
    update, if the access request corresponds to the valid page address in the prediction table, one or more replacement policy bits of a prediction table entry associated with the valid page address to maintain the prediction table,
    detect a tag hit in the first memory, wherein the tag hit is to be associated with the access request,
    clear, if the access request corresponds to the valid page address in the prediction table, a valid bit of the prediction table entry associated with the valid page address in response to the tag hit,
    detect hits with respect to the first memory, wherein each of the hits does not correspond to any valid page address in the prediction table, and
    prevent the prediction table from tracking the hits by a bypass of one or more of any entry allocation in the prediction table to the hits or any bit allocation in the prediction table to the hits.

2. The apparatus of claim 1, wherein, to maintain the prediction table, the logic coupled to the one or more substrates is further configured to:
    detect a tag miss in the first memory,
    create, if the tag miss does not correspond to any valid page address in the prediction table, a new entry in the prediction table in response to the tag miss,
    set a valid bit of the new entry, and
    update one or more replacement policy bits of the new entry.

3. The apparatus of claim 2, wherein the logic coupled to the one or more substrates is configured to replace an invalid entry in the prediction table to create the new entry.

4. The apparatus of claim 2, wherein the logic coupled to the one or more substrates is configured to replace a valid entry in the prediction table based on one or more replacement policy bits of the valid entry to create the new entry.

5. A system comprising:
a processor to issue an access request;
a first memory;
a second memory, wherein the first memory is associated with a shorter access time than the second memory; and
a memory controller coupled to the processor, the first memory and the second memory, the memory controller configured to:
   maintain a prediction table that tracks missed page addresses with respect to the first memory,
   send, if the access request does not correspond to any valid page address in the prediction table, the access request to the first memory,
   send, if the access request corresponds to a valid page address in the prediction table, the access request to the first memory and the second memory in parallel,
   detect hits with respect to the first memory, wherein each of the hits does not correspond to any valid page address in the prediction table, and
   prevent the prediction table from tracking the hits by a bypass of one or more of any entry allocation in the prediction table to the hits or any bit allocation in the prediction table to the hits.

6. The system of claim 5, wherein, to maintain the prediction table, the memory controller is configured to:
detect a tag miss in the first memory,
create, if the tag miss does not correspond to any valid page address in the prediction table, a new entry in the prediction table in response to the tag miss,
set a valid bit of the new entry, and
update one or more replacement policy bits of the new entry.

7. The system of claim 6, wherein the memory controller is configured to replace an invalid entry in the prediction table to create the new entry.

8. The system of claim 6, wherein the memory controller is configured to replace a valid entry in the prediction table based on one or more replacement policy bits of the valid entry to create the new entry.

9. The system of claim 5, wherein, if the access request corresponds to the valid page address in the prediction table, the memory controller is configured to update one or more replacement policy bits of a prediction table entry associated with the valid page address to maintain the prediction table.

10. The system of claim 5, wherein the memory controller is configured to:
detect a tag hit in the first memory, wherein the tag hit is to be associated with the access request, and
clear, if the access request corresponds to the valid page address in the prediction table, a valid bit of a prediction table entry associated with the valid page address in response to the tag hit.

11. A semiconductor package apparatus comprising:
one or more substrates; and
logic coupled to the one or more substrates, wherein the logic is implemented at least partly in one or more of configurable logic or fixed functionality logic hardware, the logic coupled to the one or more substrates configured to:
maintain a prediction table that tracks missed page addresses with respect to a first memory,
send, if an access request does not correspond to any valid page address in the prediction table, the access request to the first memory,
send, if the access request corresponds to a valid page address in the prediction table, the access request to the first memory and a second memory in parallel, wherein the first memory is associated with a shorter access time than the second memory,
detect hits with respect to the first memory, wherein each of the hits does not correspond to any valid page address in the prediction table, and
prevent the prediction table from tracking the hits by a bypass of one or more of any entry allocation in the prediction table to the hits or any bit allocation in the prediction table to the hits.

12. The apparatus of claim 11, wherein, to maintain the prediction table, the logic coupled to the one or more substrates is configured to:
detect a tag miss in the first memory,
create, if the tag miss does not correspond to any valid page address in the prediction table, a new entry in the prediction table in response to the tag miss,
set a valid bit of the new entry, and
update one or more replacement policy bits of the new entry.

13. The apparatus of claim 12, wherein the logic coupled to the one or more substrates is configured to replace an invalid entry in the prediction table to create the new entry.

14. The apparatus of claim 12, wherein the logic coupled to the one or more substrates is configured to replace a valid entry in the prediction table based on one or more replacement policy bits of the valid entry to create the new entry.

15. The apparatus of claim 11, wherein, if the access request corresponds to the valid page address in the prediction table, the logic coupled to the one or more substrates is configured to update one or more replacement policy bits of a prediction table entry associated with the valid page address to maintain the prediction table.

16. The apparatus of claim 11, wherein the logic coupled to the one or more substrates is configured to:
detect a tag hit in the first memory, wherein the tag hit is to be associated with the access request, and
clear, if the access request corresponds to the valid page address in the prediction table, a valid bit of a prediction table entry associated with the valid page address in response to the tag hit.

17. A method comprising:
maintaining a prediction table that tracks missed page addresses with respect to a first memory;
sending, if an access request does not correspond to any valid page address in the prediction table, the access request to the first memory;
sending, if the access request corresponds to a valid page address in the prediction table, the access request to the first memory and a second memory in parallel, wherein the first memory is associated with a shorter access time than the second memory;
detecting hits with respect to the first memory, wherein each of the hits does not correspond to any valid page address in the prediction table; and
preventing the prediction table from tracking the hits by a bypass of one or more of any entry allocation in the prediction table to the hits or any bit allocation in the prediction table to the hits.

18. The method of claim 17, wherein maintaining the prediction table includes:
detecting a tag miss in the first memory;
creating, if the tag miss does not correspond to any valid page address in the prediction table, a new entry in the prediction table in response to the tag miss;
setting a valid bit of the new entry; and
updating one or more replacement policy bits of the new entry.

19. The method of claim 18, wherein creating the new entry includes replacing an invalid entry in the prediction table.

20. The method of claim 18, wherein creating the new entry includes replacing a valid entry in the prediction table based on one or more replacement policy bits of the valid entry.

21. The method of claim 17, wherein maintaining the prediction table includes, if the access request corresponds to the valid page address in the prediction table, updating one or more replacement policy bits of a prediction table entry associated with the valid page address.

22. The method of claim 17, further including:
   detecting a tag hit in the first memory, wherein the tag hit is associated with the access request; and
   clearing, if the access request corresponds to the valid page address in the prediction table, a valid bit of a prediction table entry associated with the valid page address in response to the tag hit.

* * * * *